R. B. FAGEOL.
VEHICLE.
APPLICATION FILED JULY 26, 1915.
1,212,616.
Patented Jan. 16, 1917.
2 SHEETS—SHEET 1.
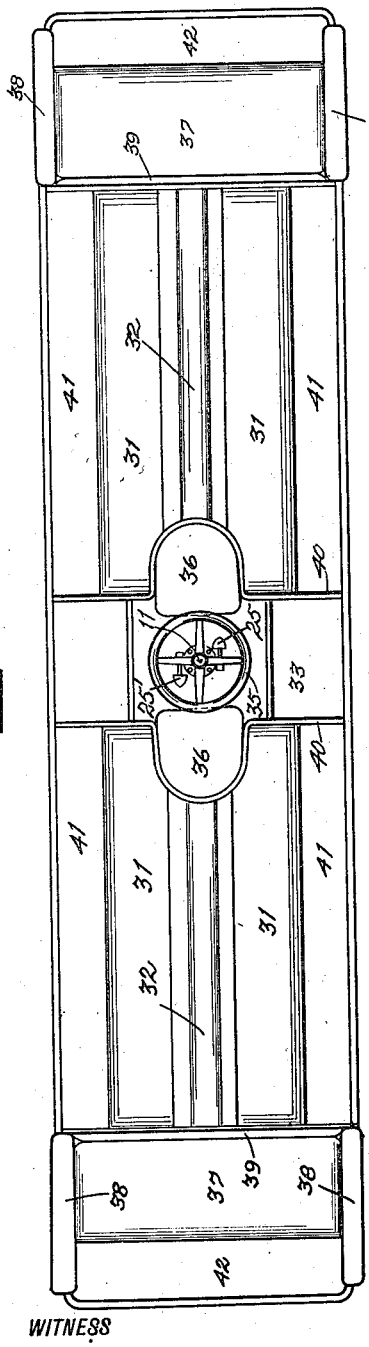
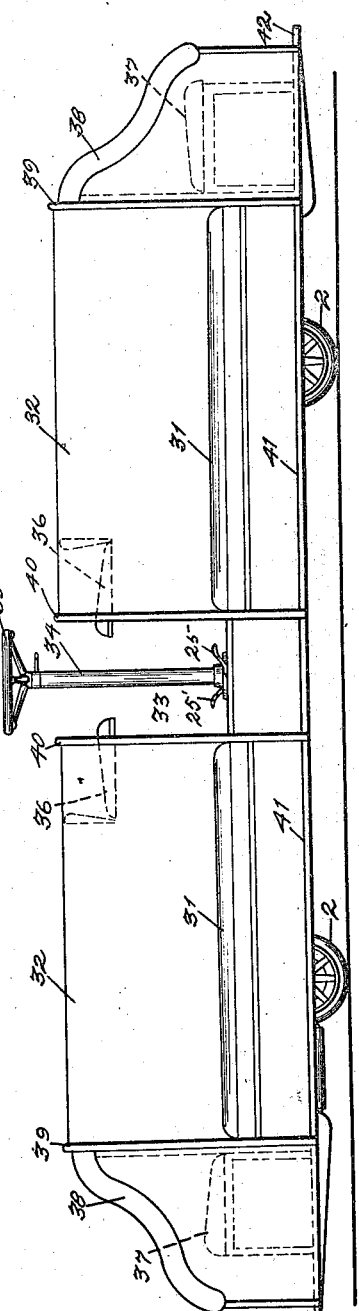
WITNESS
INVENTOR
Rollie B. Fageol
BY
ATTORNEYS

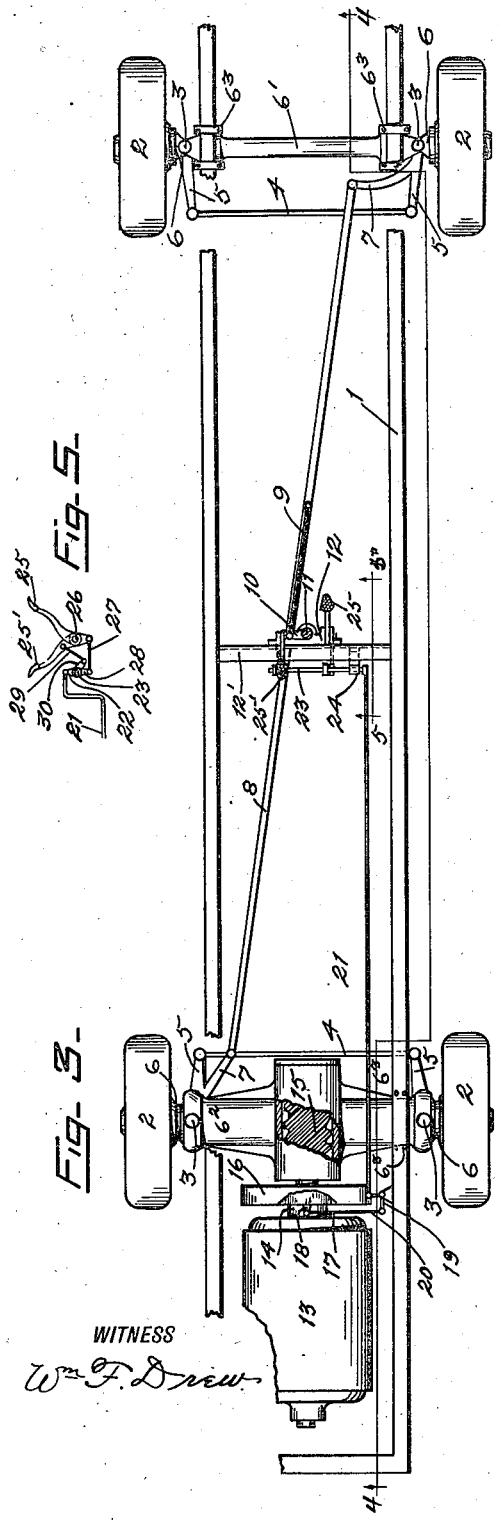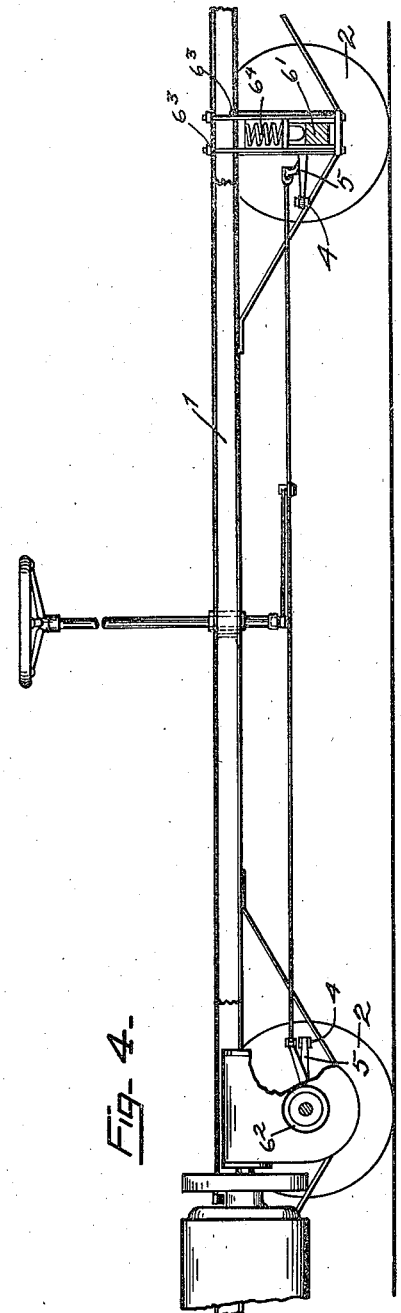

UNITED STATES PATENT OFFICE.

ROLLIE B. FAGEOL, OF OAKLAND, CALIFORNIA.

VEHICLE.

1,212,616.   Specification of Letters Patent.   Patented Jan. 16, 1917.

Application filed July 26, 1915. Serial No. 41,824.

*To all whom it may concern:*

Be it known that I, ROLLIE B. FAGEOL, a citizen of the United States, residing at Oakland, in the county of Alameda and State of California, have invented certain new and useful Improvements in Vehicles, of which the following is a specification.

The present invention relates to an improved form of vehicle, particularly of the passenger carrying type, capable of operation in either direction, and has for its objects to provide a body adapted for carrying a number of passengers and in which there is a transverse passage intermediate the vehicle ends, wherein there is located the controlling and steering mechanism, and in which passage the operator is stationed, there being provided a seat for the operator on opposite sides of the passage, one facing toward either end of the vehicle so that the operator may face in the direction of travel of the vehicle. To provide a vehicle wherein the operator is so located that he may collect the fares from the passengers without leaving the station.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction, within the scope of the claims may be resorted to without departing from the spirit or sacrificing any of the advantages of the invention.

To comprehend the invention, reference is directed to the accompanying drawings, wherein:—

Figure 1 is a view in plan of an embodiment of my invention, disclosing the preferred form of vehicle body. Fig. 2 is a view in side elevation. Fig. 3 is a view in plan of the running gear, disclosing the four wheel steer and two wheel drive. Fig. 4 is a sectional view taken on line 4—4 of Fig. 3. Fig. 5 is a sectional view of the brake operating mechanism, taken on line 5—5 of Fig 3.

Referring more particularly to the several views of the drawings, wherein like characters of reference designate corresponding parts,—1 indicates a suitable vehicle frame supported by the wheels 2. Each pair of wheels are pivotally mounted, as at 3, to swing on a vertical axis and the wheels of each pair are connected by the rods 4 pivotally attached to arms 5 extending from the wheel supporting spindle 6. The spindles at one end of the vehicle are carried by the axle 6' and at the other are carried by a suitable axle housing 6². The axle and axle housing are mounted in guides 6³ extending beneath the frame, and springs 6⁴ are interposed between the respective axles and axle housing and the underside of the vehicle frame. Other arms 7 extending from the spindles of the respective pairs of wheels at opposite sides of the frame 1 are connected by a steering rod 8 which is pivotally connected through a link 9 with the arm 10 of a vertically disposed steering post 11 mounted to rotate in a bearing 12 carried by a member 12' extending preferably centrally of the frame.

An electric motor 13 is carried by the frame 1 and from the same extends the shaft 14 carrying the worm 15, and said motor drives one pair of supporting wheels through any suitable form of driving and steering axle of the well known type, which is rotatably mounted in the axle housing. As these forms of driving and steering axles are well known, and any type thereof may be employed, it is not thought necessary to illustrate a detail of the preferred form.

A suitable brake is provided on the motor shaft, and the same includes a flanged brake wheel or drum 16 in which is mounted the brake band 17 carrying the lug 18, which is connected to the pivoted crank arm 19 by the link 20. The other end of said crank arm 19 is pivotally connected by a link 21 with an arm 22 on a shaft 23 carried in bearings 24 mounted on the member 12'. Oppositely disposed brake pedals 25 and 25' are mounted on a shaft 26 and are positioned one on each side of the steering post 11, and the lower end of said pedal 25 is connected through a link 27 with an arm 28 on the shaft 23. A link 29 pivotally connects the pedal 25' above its pivotal point with an arm 30 also carried by the shaft 23.

Positioned over the vehicle frame 1 is a suitable passenger carrying body formed with longitudinally disposed oppositely facing seats 31 separated by the back 32. The seats 31 are interrupted approximately midway of their length by a transverse passage 33 in which is positioned the steering post 11 and brake pedals 25 and 25'. The steering post is inclosed by a housing 34 and carries a steering wheel 35, on opposite sides of which are positioned the seats 36 for the operator, one facing toward each end of the vehicle. Across the ends of the vehicle body are the end seats 37 which face outwardly, and are provided with the side arms 38. The back 39 of the end seats provide ends for the side seats 31 and the side walls 40 of the transverse passage 33 provide ends for the side seats on either side of the passage. Suitable running boards 41 are provided for the side seats 31 and the outer edges thereof are preferably flush with the side arms 38 of the end seats. The end seats are provided with suitable foot rests or running boards 42.

It will be apparent that I have provided a vehicle body wherein the vehicle operator is stationed intermediate the ends thereof, and means are provided whereby the operator may face either end of the vehicle and have the controlling and steering means in front of him at all times. The vehicle may be of such length as to enable the operator to collect the fares of the passengers without leaving the operating station, thereby dispensing with the services of a conductor. A vehicle has been provided in which the passengers will have easy access to and from the seats, whereby considerable time will be saved in the taking on and discharge of passengers.

Having thus described my invention what I claim is:—

1. A passenger carrying vehicle having a plurality of sets of supporting wheels, certain of said wheels capable of driving the vehicle in either direction, and all of said wheels capable of simultaneous pivotal movement in the steering thereof, to insure a uniform steering of the vehicle when traveling in either direction, said vehicle including a passenger carrying body provided with passenger carrying seats and formed intermediate of its ends with a transversely disposed vehicle controlling and steering station, means whereby the operator may be seated on either side of said controlling station, enabling the operator to face the direction of travel of said vehicle.

2. A passenger carrying vehicle having steering and supporting wheels and capable of driving in either direction and including a body provided with longitudinally disposed outwardly facing passenger carrying side seats, an outwardly facing passenger carrying seat at each end of the body, said body formed intermediate of its ends with a transversely disposed vehicle controlling station extending for the full width of the body, vehicle controlling means extending centrally of said station, and an operator's seat on each side of said controlling station, one facing toward each end of the vehicle enabling the operator to face toward either end of the vehicle in the direction of travel of the same and with the controlling means in advance of the operator.

In testimony whereof I have signed my name to this specification in the presence of a subscribing witness.

ROLLIE B. FAGEOL.

Witness:
    D. B. RICHARDS.